US006860094B1

(12) United States Patent
Abrams

(10) Patent No.: US 6,860,094 B1
(45) Date of Patent: Mar. 1, 2005

(54) RIGID LINER FOR A REFUSE BAG

(76) Inventor: Howard Abrams, 64 Timothy Dr., Ivyland, PA (US) 18974

(*) Notice: Subject to any disclaimer, the term of this patent is extended or adjusted under 35 U.S.C. 154(b) by 4 days.

(21) Appl. No.: 10/449,346

(22) Filed: May 30, 2003

(51) Int. Cl.[7] .............................................. A01D 43/063

(52) U.S. Cl. ................................ 56/202; 56/5; 100/246

(58) Field of Search ................................ 100/246, 247, 100/265, 90; 56/202, 320.2, 5

(56) References Cited

U.S. PATENT DOCUMENTS

| | | | | |
|---|---|---|---|---|
| 576,782 A | | 2/1897 | Goodrich | |
| 579,228 A | | 3/1897 | Frame | |
| 645,544 A | | 3/1900 | Bissell | |
| 1,503,183 A | | 7/1924 | Bailey | |
| 1,668,053 A | | 5/1928 | Dawson | |
| 2,172,529 A | | 9/1939 | Barker et al. | |
| 3,722,561 A | | 3/1973 | O'Leary et al. | |
| 3,822,524 A | | 7/1974 | Jerpbak | |
| 3,863,563 A | | 2/1975 | Popeil | |
| 3,903,565 A | * | 9/1975 | Hicks | 15/352 |
| 3,936,087 A | | 2/1976 | Alexander | |
| 4,037,778 A | | 7/1977 | Boyle | |
| 4,268,081 A | | 5/1981 | Hawkinson | |
| 4,350,366 A | * | 9/1982 | Helms | 280/655 |
| 4,362,309 A | * | 12/1982 | Stamper | 280/47.19 |
| 4,530,533 A | | 7/1985 | Dieter | |
| 4,643,380 A | | 2/1987 | Copeland | |
| 4,697,771 A | | 10/1987 | Majors | |
| 4,749,011 A | | 6/1988 | Rylander | |
| 4,760,982 A | | 8/1988 | Cooke | |
| 4,832,292 A | | 5/1989 | Beckham | |
| 4,881,362 A | * | 11/1989 | Parker et al. | 56/202 |
| 4,890,652 A | | 1/1990 | Hoerner | |
| 4,979,547 A | | 12/1990 | Hoerner | |
| 5,065,965 A | | 11/1991 | Aulabaugh | |
| 5,070,687 A | * | 12/1991 | Schweigert | 56/202 |
| 5,129,609 A | | 7/1992 | Tobin | |
| 5,180,125 A | | 1/1993 | Caveney | |
| 5,226,554 A | | 7/1993 | Dauphinais | |
| 5,271,589 A | | 12/1993 | Belous | |
| 5,316,060 A | | 5/1994 | Hodgdon et al. | |
| 5,358,138 A | | 10/1994 | Karwoski | |
| 5,393,022 A | | 2/1995 | Palumbo | |
| 5,593,117 A | | 1/1997 | Alexander, III | |
| 5,597,022 A | | 1/1997 | Reifers | |
| 5,716,033 A | | 2/1998 | Gibson | |
| 5,797,314 A | | 8/1998 | Hendrick | |
| 5,806,416 A | | 9/1998 | Cerniglia et al. | |
| 5,897,084 A | | 4/1999 | Judge | |
| 6,085,647 A | | 7/2000 | Burow | |
| 6,109,002 A | | 8/2000 | McCabe | |
| 6,415,713 B1 | | 7/2002 | Abrams | |

* cited by examiner

*Primary Examiner*—Meredith Petravick
(74) *Attorney, Agent, or Firm*—Caesar, Rivise, Bernstein, Cohen & Pokotilow, Ltd.

(57) ABSTRACT

A rigid refuse bag liner for insertion into a yard refuse bag for supporting the yard refuse bag in an open condition. The rigid yard refuse bag liner is an elongated enclosure having an open bottom and having a tapered construction such that its bottom portion is wider than its top portion, which facilitates the removal of the rigid liner once the refuse bag liner/refuse bag are filled with yard refuse. To further facilitate this removal, air vents running through the enclosure permit the passage of air as the rigid liner is lifted upward, out of the yard bag. A compactor is associated with the rigid liner whereby the compactor is a planar surface coupled to a handle that the user can grasp and apply pressure to in order to compact the yard refuse that has already been collected. The rigid refuse bag liner can be inserted into a yard refuse bag and that combination can then be used on a bagger attachment device coupled to a riding lawn mower for automatically collecting grass cuttings therein. Also, the filled liner/yard refuse bag can be wheeled to a trash pick-up location using a cart.

20 Claims, 4 Drawing Sheets

RIGID LINER FOR A REFUSE BAG

BACKGROUND OF THE INVENTION

1. Field of Invention

This invention relates to devices for supporting trash bags during filling, and more particularly, to devices for filling yard refuse bags for re-cycling purposes.

2. Description of Related Art

Many townships require residents to separate yard refuse from other trash that is set out for scheduled pick-up by placing the yard refuse in specially-designated yard refuse bags. These yard refuse bags consist of heavy paper and are rectangular in shape, much like a large shopping bag.

However, in order to fill these bags many problems occur. For example, since the yard refuse bag consists of paper, there is no support, other than the heavy paper structure to maintain in it an open position. In addition, when the person begins filling the bag and attempts to compact the collected contents, the shape of the bag becomes distorted, causing it to fall over and/or causing any compacted twigs, branches, etc. to tear or rip the bag during the filling. If the user wants to avoid this, the user may simply not fill the entire bag, but rather just obtain another bag, thereby not getting the full use of the yard refuse bag which is wasteful.

The following patents are examples of attempts to solve some of the above problems but suffer from one or more other problems discussed below.

U.S. Pat. Nos. 4,890,652/4,979,547/(Hoerner) disclose a collapsible trash bag support sleeve. However, the sleeve suffers from a number of problems such as failure to retain a rectangular shape during filling, thereby stressing the bag which tends to rip it. Furthermore, the trash bag's upper portion must be secured in anchoring slits that tend to rip the trash bag during filling. In addition, despite the use of firm panels, the overall sleeve may tend to twist and deform; this distortion not only makes it difficult to release the sleeve from the trash bag (once the bag is filled), but it also tends to rip/tear the trash bag. In addition, the use of adhesives, or other closure means, to form the rectangular sleeve tends to wear after much use, which further aggravates the tendency to distort the sleeve shape. Should the closure means disengage, the yard refuse is then exposed to the trash bag, thereby defeating the purpose of the sleeve. See also U.S. Pat. No. 4,037,778 (Boyle); U.S. Pat. No. 5,897,084 (Judge).

U.S. Pat. No. 5,597,022 (Reifers) discloses a device for loading trash bags. However, this device is meant for particular use with a conventional plastic trash bag and would, most likely, tear or rip a yard refuse bag due to the latter's rectangular construction and the bag engagement mechanism at the top of the device. Furthermore, the device requires that the user frequently lift the device/bag as it is filled in different stages in order to force collected yard refuse down inside the bag.

U.S. Pat. No. 3,722,561 (O'Leary et al.) discloses a support for a flexible container. However, this support suffers from, among other things, a slit that can expose the refuse to the trash bag directly. In addition, this support is designed for a small, in-house trash container, not a large yard refuse bag.

Other trash bag support devices are shown in the following U.S. patents, namely, U.S. Pat. No. 576,782 (Goodrich); U.S. Pat. No. 579,228 (Frame); U.S. Pat. No. 645,544 (Bissell); U.S. Pat. No. 1,668,053 (Dawson); U.S. Pat. No. 2,172,529 (Barker et al.); U.S. Pat. No. 3,822,524 (Jerpbak); U.S. Pat. No. 3,936,087 (Alexander); U.S. Pat. No. 4,268,081 (Hawkinson); U.S. Pat. No. 4,749,011 (Rylander); U.S. Pat. No. 4,530,533 (Dieter); U.S. Pat. No. 4,760,982 (Cooke); U.S. Pat. No. 4,832,292 (Beckham); U.S. Pat. No. 5,065,965 (Aulabaugh); U.S. Pat. No. 5,129,609 (Tobin); U.S. Pat. No. 5,180,125 (Caveney); U.S. Pat. No. 5,226,554 (Dauphinais); U.S. Pat. No. 5,271,589 (Belous); U.S. Pat. No. 5,316,060 (Hodgon et al.); U.S. Pat. No. 5,393,022 (Palumbo); U.S. Pat. No. 5,593,117 (Alexander, III); U.S. Pat. No. 5,716,033 (Gibson).

However, none of these references appear to teach or suggest the use of a rigid liner inside a yard refuse bag that not only prevents the tearing/ripping of the yard bag during filling, but remains stable throughout the filling and removal operation, while providing features that facilitate the removal of the liner from the yard refuse bag after filling.

All references cited herein are incorporated herein by reference in their entireties.

BRIEF SUMMARY OF THE INVENTION

An apparatus for facilitating the collection of grass cuttings from a riding lawn mower into a yard refuse bag. The apparatus comprises: an elongated rigid enclosure having an open bottom and open top, wherein the elongated rigid enclosure comprises sides and a plurality of air vents, and wherein each of the air vents forms a passageway contained in a corner joining two adjacent sides or contained in a side. The passageway has an opening disposed in the open top and an opening disposed in the open bottom of the elongated rigid enclosure. The apparatus is adapted to be positioned inside the yard refuse bag and for supporting the yard refuse bag along its length during filling; and a bagger attachment device that is moved by the riding lawn mower and includes: a support surface coupled to the riding lawn mower for supporting the elongated rigid enclosure inside the yard refuse bag; and a plenum having a first end that couples to a grass shoot in the riding lawn mower and a second end coupled to a cover that passes the grass cuttings into the open top of the enclosure.

An apparatus for facilitating the collection of yard refuse (e.g., grass cuttings, dry leaves, twigs, branches, trimmed shrubbery, or any other waste designated by local ordinances to be "yard waste sufficient for re-cycling") into a yard refuse bag. The apparatus comprises: an elongated rigid enclosure having an open bottom and open top, wherein the elongated rigid enclosure comprises sides and a plurality of air vents, and wherein each of the air vents forming a passageway contained in a corner joining two adjacent sides or contained in a side. The passageway has an opening disposed in the open top and an opening disposed in the open bottom of the elongated rigid enclosure. The apparatus is adapted to be positioned inside the yard refuse bag and for supporting the yard refuse bag along its length during filling; and a cart for holding at least one elongated rigid enclosure/yard refuse bag combination that is filled with yard refuse. The cart permits a user to move the filled enclosure/yard refuse bag combination to recyclable trash pick-up location.

A method for facilitating the collection of grass cuttings from a riding lawn mower into a recyclable yard refuse bag, said method comprising the steps of: (a) disposing an elongated rigid enclosure having an open bottom and open top inside the recyclable yard refuse bag to form an assembly; (b) positioning the assembly on a bagger attachment device that is coupled to the riding lawn mower; (c) directing the grass cuttings from the grass shoot of the riding lawn mower into the open top of the enclosure; and (d) removing said enclosure from the recyclable yard refuse bag once the bag is filled.

An apparatus for facilitating the collection of yard refuse (e.g., grass cuttings, dry leaves, twigs, branches, trimmed shrubbery, or any other waste designated by local ordinances to be "yard waste sufficient for re-cycling") into a yard refuse bag. The apparatus comprises an elongated rigid enclosure having an open bottom and open top, wherein the elongated rigid enclosure comprises sides and a plurality of air vents, and wherein each of the air vents forms a passageway contained in a corner joining two adjacent sides or contained in a side. The passageway has an opening disposed in the open top and an opening disposed in the open bottom of the elongated rigid enclosure. The apparatus is adapted to be positioned inside the yard refuse bag and for supporting the yard refuse bag along its length during filling.

BRIEF DESCRIPTION OF SEVERAL VIEWS OF THE DRAWINGS

The invention will be described in conjunction with the following drawings in which like reference numerals designate like elements and wherein.

DETAILED DESCRIPTION OF THE INVENTION

Figure 1:
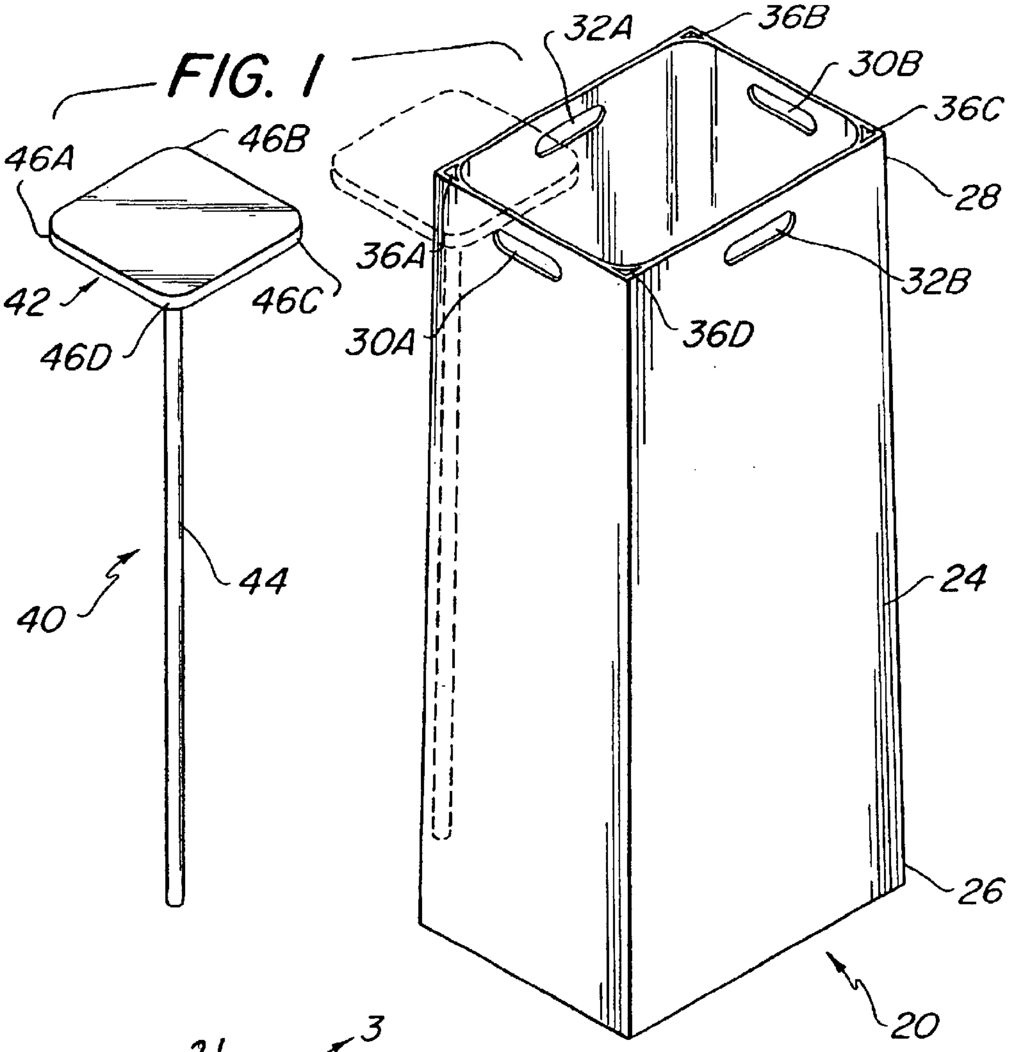
FIG. 1 is an isometric view showing the rigid yard bag liner and a manual compactor.
Figure 2:
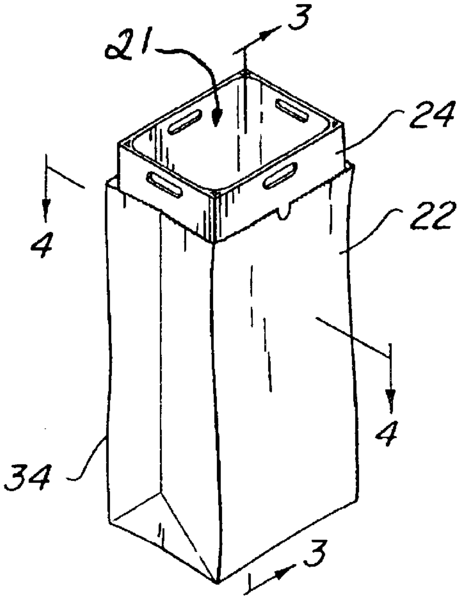
FIG. 2 is an isometric view showing the rigid yard bag liner partially disposed inside a yard refuse bag.

The invention will be illustrated in more detail with reference to the following Examples, but it should be understood that the present invention is not deemed to be limited thereto.

Referring now in detail to the various figures of the drawing wherein like reference characters refer to like parts, there is shown at 20, a rigid yard refuse bag liner for use with a yard refuse bag to facilitate the collection of yard refuse (e.g., dry leaves, twigs, branches, trimmed shrubbery, or any other waste designated by local ordinances to be "yard waste sufficient for re-cycling") into a yard refuse bag 22.

The liner 20 comprises a rigid elongated enclosure 24 comprising a one-piece molded construction (e.g., using a plastic-injected one-piece molding or blow molding machine), of any durable material, e.g., polyethylene, PVC (poly vinyl chloride) including polymers, other plastic materials including re-cyclable plastics and other plastic compounds. The enclosure 24 has no bottom surface (see FIG. 4) in order to permit the liner 20 to be removed from the yard refuse bag 22, once the enclosure 24/yard refuse bag 22 is filled up. The enclosure 24 also has an open top 21.

It should be understood that the term "rigid" as used in this patent application defines that the enclosure is of a non-collapsible construction, i.e., it cannot be disassembled and/or folded up.

Figure 3:
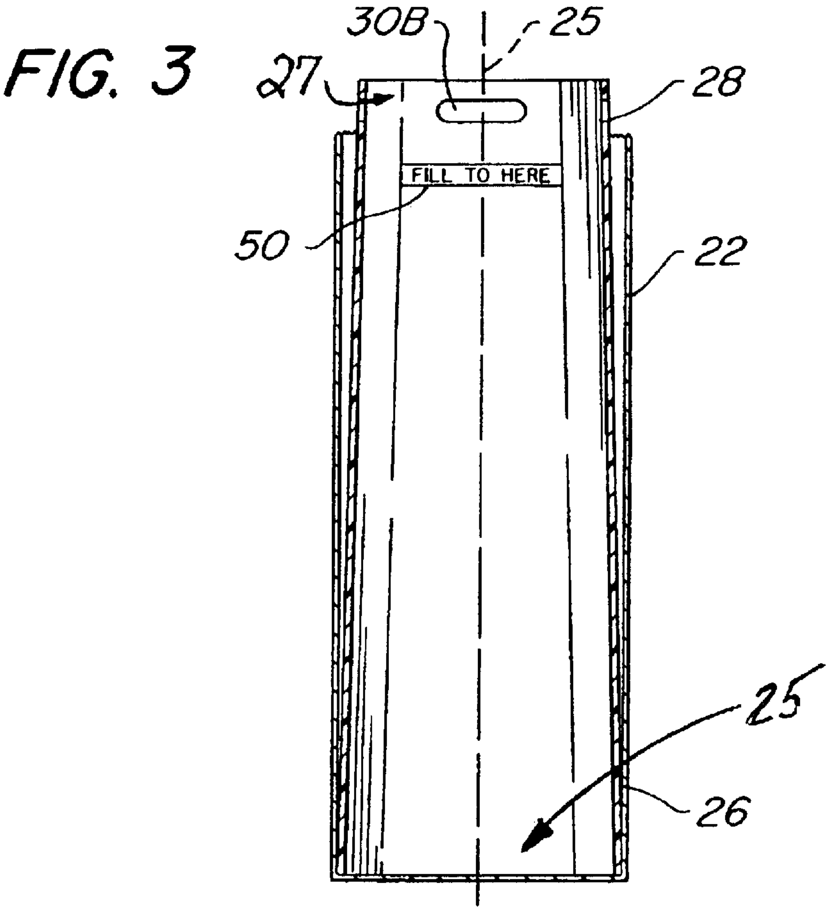
FIG. 3 is a cross-sectional view of the rigid yard bag liner and yard bag taken along line 3—3 of FIG. 2.

To facilitate the removal of the liner 20 once the enclosure, 24/yard refuse bag 22 are filled up, the enclosure 24 comprises a tapered construction, i.e., the bottom portion 26 is wider than the top portion 28, with reference to a longitudinal axis 25, FIG. 3. In particular, once the enclosure 24/yard refuse bag 22 is filled up, as the user pulls the enclosure 24 upward using any pair of handles 30A/30B or 32A/32B out of the yard bag 22, the bottom portion 26 of the enclosure is able to slide over the yard refuse (not shown), thereby releasing it into the lower portion 34 of the yard bag 22, while forcing yard refuse in the upper portion 28 of the enclosure 24 downward through the enclosure 24 and finally out into the yard bag 22. In addition, the tapered construction of the enclosure 24 also stabilizes the enclosure 24/yard bag 22 by providing a lower portion 26 base that is wider than the top portion 28.

To further facilitate the removal of enclosure 24 from the yard bag 22, air vents 36A–36D are positioned in the enclosure 24. In the preferred embodiment, where the enclosure 24 is a four-sided enclosure, these vents 36A–36D are located in the four corners of enclosure 24. These vents 36A–36D, running the length of the enclosure 24, permit trapped air to escape when the enclosure 24 is being lifted out of the yard bag 22.

It should be understood that these air vents 36A–36D could, alternatively, be located in the sides of the enclosure 24 also and are not restricted to being located in the corners of the enclosure 24. For example, as shown most clearly in FIG. 4, wall vents 136A–136D also run the length of the enclosure 24 and are located off-center of each wall so as to allow each vent to provide an air passageway from the bottom 23 (FIG. 3) of the enclosure 24 to the top 27 of the enclosure 24 without passing through the respective handle located in each wall.

Within the enclosure 24, the corners 38A–38D are rounded. This minimizes yard refuse, such as twigs or branches, getting lodged in the corners of the enclosure 24 which would occur if square corners were used.

Figure 4:
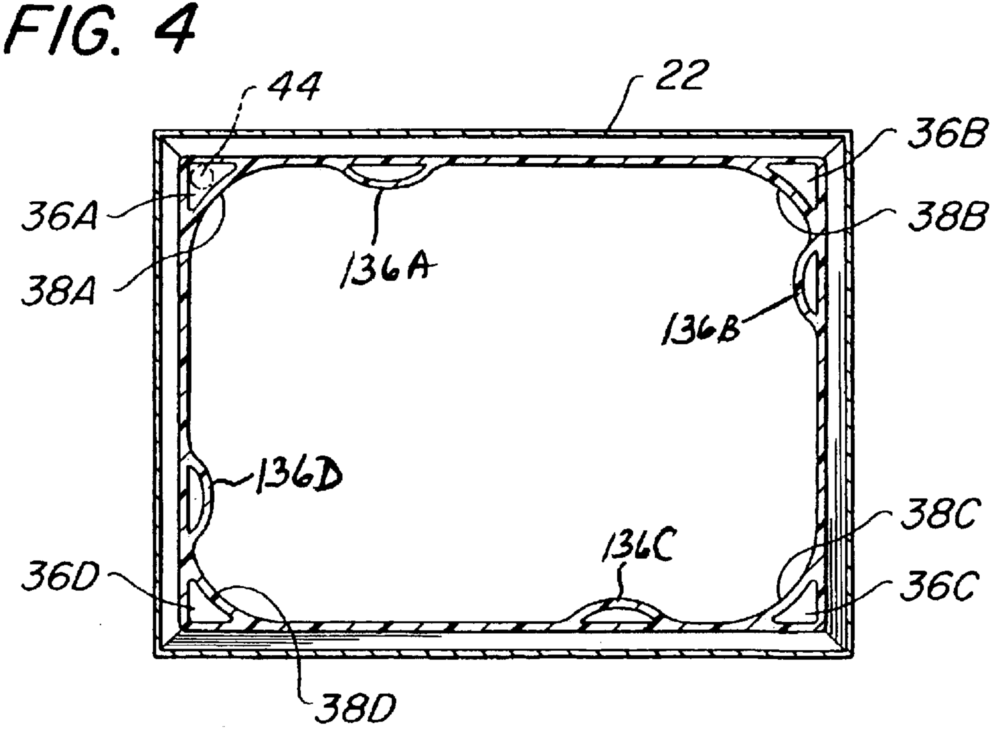
FIG. 4 is a cross-sectional view of the rigid yard bag liner and yard bag taken along line 4—4 of FIG. 2.

Associated with the rigid enclosure 24 is a compactor 40. The compactor 40 comprises a planar surface 42 and a handle 44. The planar surface 42 also comprises rounded corners 46A–46D that correspond to the rounded corners 38A–38D. As the enclosure 24/yard refuse bag 22 begins to fill up, the user grasps the compactor 40 with the handle 44 and applies pressure against the yard refuse with the planar surface 42 to compact the yard refuse in the enclosure 24/yard refuse bag 22. To maximize the compacting of yard refuse in the corners 38A–38D of the enclosure 24, the user can align one of the rounded corners 46A–46D with one of the corners 38A–38D and press downward, thereby compacting yard refuse located in the particular corner of the enclosure 24. Furthermore, during non-use, the compactor 40 can be stowed in the enclosure 24 by positioning the handle 44 into one of the air vents; e.g., as shown in FIG. 4, the handle 44 is stowed in air vent 36A.

To use the liner 20, the user opens a yard refuse bag 22 and then inserts the enclosure 24 into the bag's 22 interior. The user then throws yard refuse into the interior of the enclosure 24. As filling occurs, the user can use the compactor 40 to compact the already-collected yard refuse, thereby making more room for more yard refuse. Furthermore, since the force of the compacting is distributed into the walls of the enclosure 24 only, and not into the yard bag 22, the usual risk of tearing/ripping the bag during compacting is avoided. When the height of the yard refuse reaches a designated height, which may be indicated by a line or other indicia 50 (FIG. 3), the user grasps one of the pairs of handles (30A/30B or 32A/32B) and lifts the enclosure 24 out of the yard bag 22.

The yard refuse bags 22 are typically heavy paper bags that are approximately 32 inches in length by approximately 16 inches in width. Although the preferred embodiment liner 20 is designed for use with such yard refuse bags 22, it is within the broadest scope of this invention to include other types of trash bags (e.g., plastic trash bags). When using a plastic trash bag with the liner 20, the upper portion of the trash bag can be passed through an opposing pair of handles (30A/30B or 32A/32B) and then knotted.

Figure 5:
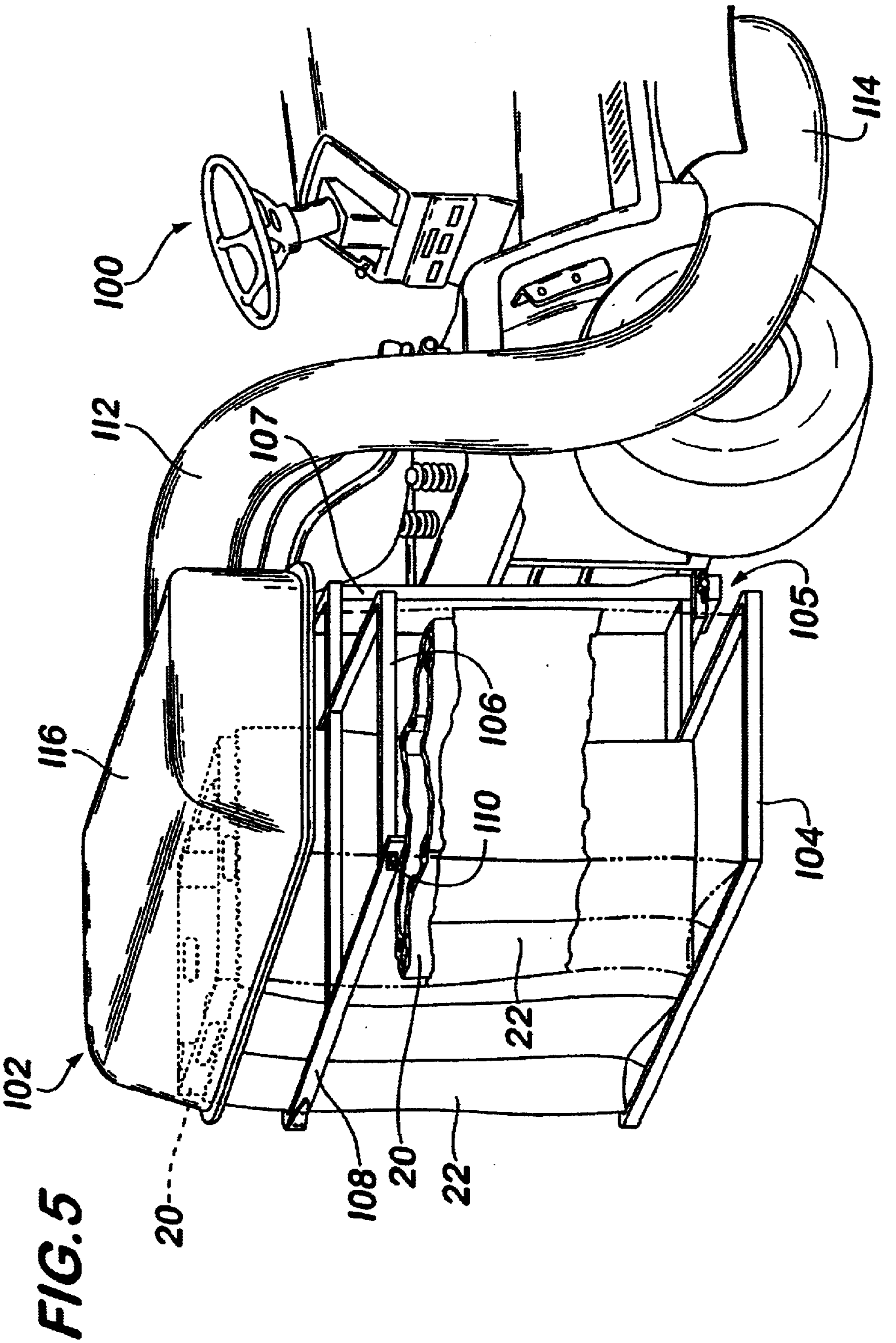
FIG. 5 depicts a bagger device attachment to a lawn tractor (shown partially) using, in plurality, the apparatus of the present invention which is shown partially-broken away.

As shown in FIG. 5, the liner 20 can also be used with a conventional riding lawn tractor 100 (e.g., a Sears Craftsman 20 hp deck lawn tractor) for automatically filling refuse bags. Typically, riding lawn tractors cut the grass and then the clippings are exhausted through a shoot that is connected to either two large rigid containers or burlap sacks. The containers or burlap sacks are then emptied by various methods of disposal. Typically, the filled containers or sacks are dumped out into a field, dumped into a wooded area, reloaded into plastic bags that will not biodegrade, or reloaded into a paper yard waste bag; however, the difficulty of loading the paper yard waste has already been described.

In contrast, the present invention 20 can be fastened in such a way in the back of the lawn tractor that the grass clippings are directly exhausted into the liner 20/refuse bag 22 combination. For example, a bagger device attachment 102 (e.g., a two bin bagger model #24979 that is sold as an accessory to the Sears Craftsman 20 hp deck lawn tractor) can be coupled to the tractor 100 and a plurality of liners 20/yard refuse bags 22 positioned thereon. In particular, before mowing begins, the operator places each enclosure 24/yard refuse bag 22 onto a pan 104 that is coupled to the tractor 100 via a hitch 105 and support member 107. To prevent each liner 20/yard refuse bag 22 from possibly falling off the pan 104 during mowing, a rail mechanism 106 surrounds the upper portion of each liner 20/yard refuse bag 22; a hinged closure bar 108 completes the rail mechanism 106 and can be releasably locked by a lock 110 (e.g., wing nuts, brackets, etc.). A lawn cutting plenum 112 couples the grass shoot 114 of the tractor 100 to a hood 116, which directs the grass cuttings into each of the liners 20/yard refuse bags 22.

Figure 6:
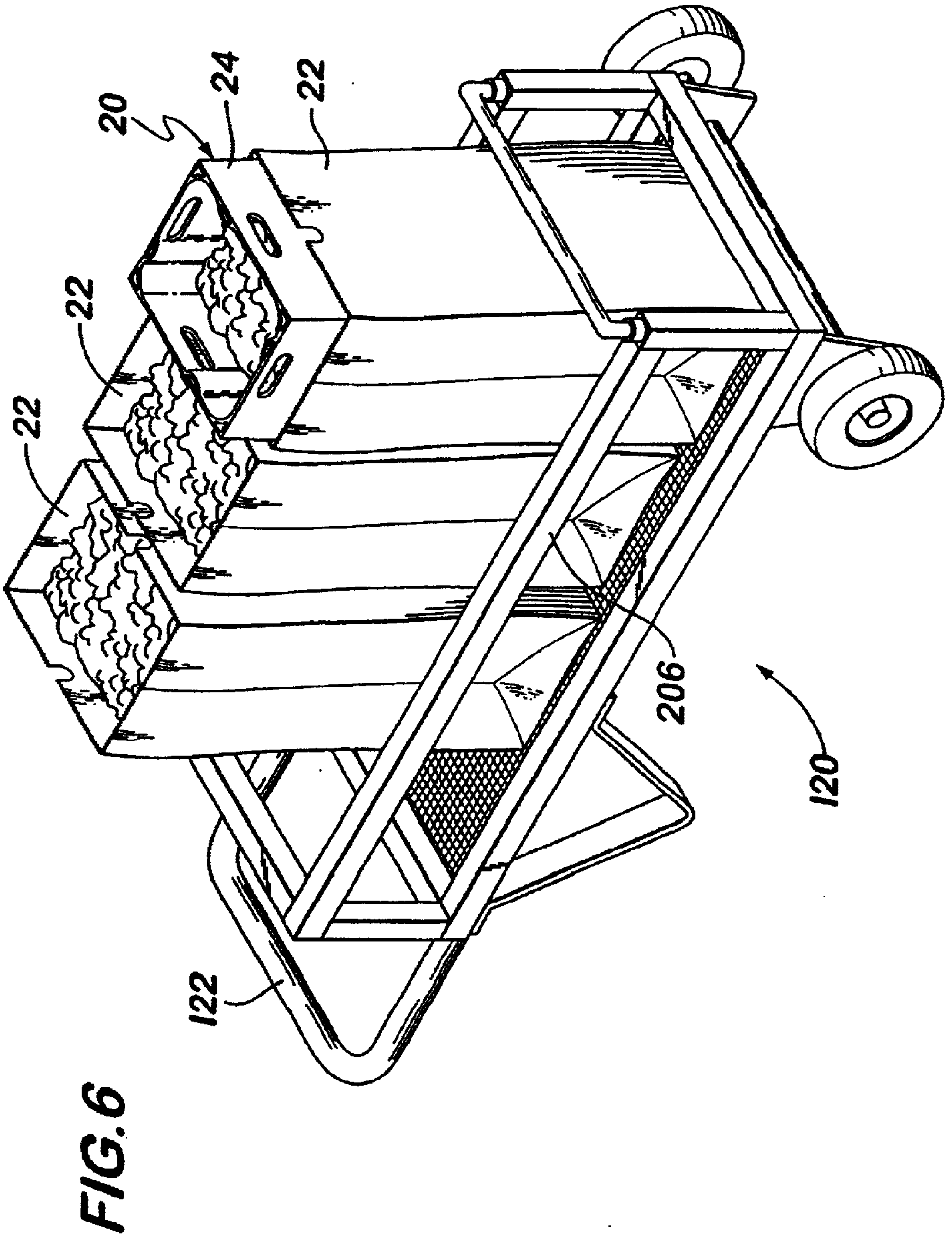
FIG. 6 is an isometric view of refuse cart showing two already-filled refuse bags and one refuse still containing the apparatus of the present invention.

Once the bags 22 are filled, the operator opens the lock 110 and opens the closure bar 108. The operator can then move the liner 20/yard refuse bag 22 onto the trash pick-up spot (e.g., curb-side) or can place the liner 20/yard refuse bag 22 onto a cart 120, as shown in FIG. 6. In either case, the operator then removes the liner 20 (or liners 20 where a plurality of these are used) from the filled yard refuse bag 22 which are now ready for collection. If the cart 120 is used, it can be wheeled to the trash pick-up spot and the filled bags 22 placed on the ground. The operator can then insert the liner 20 into a new yard refuse bag 22 and place that combination back onto the pan 104 to collect more grass cuttings. The cart 120 can be used to store the liners 20 when not in use. The cart 120 also includes a rail mechanism 206 that prevents the filled enclosure 24/yard refuse bag 22 from falling off the cart 120 during movement of the cart 120. The cart 120 also includes a hand grip 122 to allow the user to move the cart 120.

Once picked up, the filled paper yard bags would not be brought to a landfill, where they would just add to the volumes of existing trash; instead, they are sent to biodegradable landfill, thereby saving localities and consumers thousands of dollars and thousands of tax payers dollars as well.

It is also within the broadest scope of the invention to include the use of the liner 20 in offices and areas where waste paper, especially copy, e.g., a paper shredder, is collected in a conventional plastic trash bag which is then thrown in the trash and not re-cycled. In contrast, the typical basket that holds the conventional plastic waste bag, can be replaced with the liner 20/recyclable refuse bag 22. To be attractive and pleasing to the eye in such a business setting, the color of the liner 20, as well as the recyclable refuse bag 22 itself, can be white; the refuse bag 22 can also include the well-known blue recycling emblem thereon so that the bag 22 is clearly identified as recyclable material. Once the liner 20/recyclable refuse bag 22 are filled with paper to a predetermined level, the normal recycling pick-up personnel can remove the liner 20, close the filled refuse bag 22 and install the liner back into a new recyclable refuse bag 22. Alternatively, where paper is not even shredded but is rather just discarded into a conventional plastic paper bag, such paper can be placed into the liner 20/recyclable refuse bag 22 at designated locations around the business.

Thousands and thousands of tons of paper could be re-used with this recycling method. Companies that recycle paper would benefit tremendously and could even make improvements in their own methods of recycling with all the extra paper coming in. Other organizations like Green Peace would embrace its potential and even promote its use. Local government laws could be enforced mandating copy paper recycling. Waste land fills would be spared extra volumes of paper material that would have normally ended up there; as a result, these filled paper recycling bags 22 can then be sent to recycling plants to be reused or sent to special landfills that results in lower fees paid by local municipalities.

It should also be understood that the liner 20 can be made in different sizes without deviating from the scope of the invention.

While the invention has been described in detail and with reference to specific examples thereof, it will be apparent to one skilled in the art that various changes and modifications can be made therein without departing from the spirit and scope thereof.

What is claimed is:

1. An apparatus for facilitating the collection of grass cuttings from a riding lawn mower into a yard refuse bag, said apparatus comprising:

an elongated rigid enclosure having an open bottom and open top, said elongated rigid enclosure comprising sides and a plurality of air vents, each of said air vents forming a passageway contained in a corner joining two adjacent sides or contained in a side, said passageway having an opening disposed in said open top and an opening disposed in said open bottom of said elongated rigid enclosure, said apparatus being adapted to be positioned inside the yard refuse bag and for supporting the yard refuse bag along its length during filling; and a bagger attachment device that is moved by the riding lawn mower and including:

a support surface coupled to the riding lawn mower for supporting said elongated rigid enclosure inside said yard refuse bag; and a plenum having a first end that couples to a grass shoot in the riding lawn mower and a second end coupled to a cover that passes the grass cuttings into said open top of said enclosure.

2. The apparatus of claim 1 wherein said bagger attachment device further comprises a rail structure that prevents said enclosure and yard refuse bag from falling off of said support surface.

3. The apparatus of claim 2 wherein said rail structure further comprises a closure bar that can be releasably locked to facilitate removal or insertion of said enclosure and yard refuse bag into said bagger attachment device.

4. An apparatus for facilitating the collection of yard refuse into a yard refuse bag, said apparatus comprising:

an elongated rigid enclosure having an open bottom and open top, said elongated rigid enclosure comprising sides and a plurality of air vents, each of said air vents forming a passageway contained in a corner joining two adjacent sides or contained in a side, said passageway having an opening disposed in said open top and an opening disposed in said open bottom of said elongated rigid enclosure, said apparatus being adapted to be positioned inside the yard refuse bag and for supporting the yard refuse bag along its length during filling; and a cart for holding at least one elongated rigid enclosure/yard refuse bag combination that is filled with yard refuse, said cart permitting a user to move said filled enclosure/yard refuse bag combination to recyclable trash pick-up location.

5. The apparatus of claim 4 wherein said cart further comprises a rail structure that prevents said enclosure and yard refuse bag from falling off of said cart.

6. A method for facilitating the collection of grass cuttings from a riding lawn mower into a recyclable yard refuse bag, said method comprising the steps of:

(a) disposing an elongated rigid enclosure having an open bottom and open top inside the recyclable yard refuse bag to form an assembly;

(b) positioning said assembly on a bagger attachment device that is coupled to the riding lawn mower;

(c) directing the grass cuttings from the grass shoot of the riding lawn mower into the open top of said enclosure; and (d) removing said enclosure from the recyclable yard refuse bag once the bag is filled.

7. The method of claim 6 wherein said step of removing said enclosure comprises first removing said assembly from said bagger attachment device and then removing said enclosure from the recyclable yard refuse bag.

8. The method of claim 6 wherein said step of removing said enclosure comprises:

(a) removing said assembly from said bagger attachment device;

(b) placing said assembly on a cart;

(c) moving said cart to a recyclable pick-up location; and (d) removing said enclosure from the recyclable yard refuse bag.

9. An apparatus for facilitating the collection of yard refuse into a yard refuse bag, said apparatus comprising an elongated rigid enclosure having an open bottom and open top, said elongated rigid enclosure comprising sides and a plurality of air vents, each of said air vents forming a passageway contained in a corner joining two adjacent sides or contained in a side, said passageway having an opening disposed in said open top and an opening disposed in said open bottom of said elongated rigid enclosure, said apparatus being adapted to be positioned inside the yard refuse bag and for supporting the yard refuse bag along its length during filling.

10. The apparatus of claim 9 wherein said elongated rigid enclosure is tapered along a longitudinal axis such that the bottom of said enclosure is wider than the top of said enclosure.

11. The apparatus of claim 9 wherein said air vents are aligned with a longitudinal axis of said enclosure.

12. The apparatus of claim 9 wherein said enclosure comprises at least two apertures near the top of said enclosure to form handles.

13. The apparatus of claim 9 wherein said rigid elongated enclosure comprises plastic.

14. The apparatus of claim 13 wherein said plastic is polyethylene.

15. The apparatus of claim 13 wherein said plastic is poly vinyl chloride.

16. The apparatus of claim 9 wherein said enclosure comprises four sides.

17. The apparatus of claim 16 wherein said elongated rigid enclosure is tapered along a longitudinal axis such that the bottom of said enclosure is wider than the top of said enclosure.

18. The apparatus of claim 17 wherein said air vents are aligned with a longitudinal axis of said closure.

19. The apparatus of claim 18 wherein said air vents are positioned in each corner of said enclosure.

20. The apparatus of claim 19 wherein each of said corners are rounded inside said enclosure.

* * * * *